3,505,425
DIMERISATION CATALYST
John Robert Jones, Walton-on-Thames, England, and Leslie Priestley, Hamburg, Germany, assignors to The British Petroleum Company Limited, London, England, a corporation of Great Britain
No Drawing. Filed Dec. 26, 1967, Ser. No. 693,101
Claims priority, application Great Britain, Jan. 10, 1967, 1,245/67
Int. Cl. C07c 3/10
U.S. Cl. 260—683.15    4 Claims

ABSTRACT OF THE DISCLOSURE

A process for preparing a catalyst suitable for the dimerisation of alpha olefins is provided which comprises mixing nickel acetyl acetonate with an aluminum alkyl alkoxide or aluminum trialkyl in the presence of an olefin, under such conditions of temperature and pressure that the olefin is maintained in the liquid phase and dimerisation is not effected.

---

This invention relates to a process for the production of dimers of alpha-olefins, particularly linear dimers.

Processes for the dimerisation of alpha olefins in the presence of aluminium alkyls, either as the sole catalytic entity or in combination with a minor proportion of an activator, are known.

British patent specification No. 713,081—Ziegler discloses a process for the polymerisation of ethylene which comprises contacting ethylene at a temperature within the range 60°–250° C. with an activator selected from hydrides of aluminium, gallium, indium and beryllium and derivatives of such hydrides in which one or more of the hydrogen atoms are substituted by hydrocarbon radicals selected from the group consisting of alkyl radicals and monovalent aromatic hydrocarbon radicals.

In particular, British patent specification No. 713,081 discloses the polymerisation of ethylene to butene-1 and higher linear alpha-olefins by contacting ethylene with aluminium triethyl at 200°–220° C. under super-atmospheric pressure.

British patent specification No. 742,642—Ziegler discloses a process for the dimerisation of a mono-olefin containing more than two carbon atoms in the molecule which comprises heating the mono-olefin at a temperature within the range 60°–250° C. in the presence of an activator selected from the hydrides of beryllium, aluminium, gallium and indium and derivatives of such hydrides in which one or more of the hydrogen atoms are substituted by hydrocarbon radicals selected from the group consisting of alkyl radicals and mono-valent aromatic hydrocarbon radicals.

In particular British patent specification No. 742,642 discloses the dimerisation of propylene to a product consisting predominantly of 2-methylpentene-1 by contacting propylene with aluminium triethyl at temperatures in the range 180°–240° C. under super-atmospheric pressure.

British patent specification No. 773,536—Ziegler discloses a process for the catalytic polymerisation of ethylene to form butene, hexene or higher liquid or solid paraffin-like polymers or mixtures thereof in the presence of an aluminium trialkyl of general formula

wherein $R_1$, $R_2$ and $R_3$ represent similar or dissimilar alkyls, in which the aluminium trialkyl is activated by nickel, cobalt or platinum.

In particular British patent specification 773,536 discloses the polymerisation of ethylene to butene-1 and higher linear alpha-olefins by contacting ethylene with aluminium triethyl and a minor proportion of nickel acetyl acetonate at 100° C. The advantage of the process described in British patent specification 773,536 with respect to prior art processes, e.g. 713,081, is stated to lie in the fact that it can be effected at much lower temperatures.

One would therefore expect that the dimerisation of an alpha-olefin, for example propylene, in the presence of a catalyst comprising an activating agent, for example an aluminium trialkyl and a complex nickel compound, for example nickel acetyl acetonate, would result in the production of a product consisting predominatly of a branched chain olefin, for example 2-methylpentene-1, and that this process could be effected at lower temperatures than those disclosed in British patent specification 742,642.

Our copending U.S. application, Ser. No. 558,588, filed June 20, 1966 discloses a process for the production of a product consisting predominately of linear dimers having an internal double bond which process comprises dimerising an alpha-olefin in the presence of a catalyst comprising a complex organic compound of a metal of Group VIII of the Periodic Table according to Mendeleef and an activating agent at a temperature in the range −40° to +200° C., under such conditions of pressure that the reactants are maintained in the liquid or partially condensed phase.

Dimerising an alpha-olefin in the presence of a catalyst comprising a relatively large proportion of the complex organic compound and the activating agent results in the production of a product which consists predominately of linear dimers having an internal double bond.

Such linear dimers are suitable for use in the manufacture of bio-degradable detergents.

The catalyst described in our copending application must be used immediately or soon after the complex organic compound has been mixed with the activating agent since it decays rapidly.

We have now discovered that if the complex organic compound is mixed with the activating agent in the presence of an olefin, which may or may not be the olefin to be dimerised, then the rate of decay of the resulting catalyst is considerably reduced.

Thus according to the present invention there is provided a process for the preparation of a catalyst suitable for use in the dimerisation of olefins which process comprises mixing a complex organic compound of a metal of Group VIII of the Periodic Table according to Mendeleef with an activating agent in the presence of an olefinically unsaturated compound which does not contain a group which complexes more strongly with the Group VIII metal than the olefinic group, under such conditions of temperature and pressure that the olefin is maintained in the liquid phase and dimerisation is not effected or is only effected to a small extent.

Preferred olefinically unsaturated compounds are olefinic hydrocarbons, particularly alpha-olefins of general formula $R\text{—}CH\text{=}CH_2$, wherein R is a hydrocarbyl radical.

Preferably R is alkyl, aryl or alkaryl group.

Most preferably the olefin is normally liquid at room temperature and atmospheric pressure so that the catalyst may be prepared under these conditions.

Alpha olefins such as 3-methylpentene-1, 4-methylpentene-1 and hexene-1 are most suitable but internal olefins such as 4-methylpentene-2, hexene-2 and hexene-3 may be used alone, in admixture with one another or in admixture with alpha olefins.

Suitable activating agents are Grignard reagents, metal alkyls and other organometallic compounds.

The preferred complex organic compounds are nickel complexes containing groups derived from β-diketones of formula $R_1COCH_2COR_2$ or β-ketoesters of formula $R_3COCH_2COOR_4$ where $R_1$, $R_2$, $R_3$ and $R_4$ are alkyl, aryl, aralkyl, cycloalkyl or another inert group. For example the nickel complex of acetyl acetone is particularly effective.

Preferably the moisture content of the nickel acetyl acetonate is reduced to below 3% by weight before use. In general, the lower the moisture content the better.

The preferred activating agents are organo aluminium compounds, most preferably aluminium alkyl alkoxides. The preferred aluminium alkyl alkoxide is aluminium diethyl ethoxide. Aluminium trialkyls, e.g., aluminium triethyl are also suitable.

Aluminium dialkyl alkoxides are preferred because they react gently with the complex organic compound and catalysts of consistent quality are obtained in successive preparations. Some other activating agents, e.g., aluminium trialkyls, react more vigorously and render temperature control of the catalyst preparation reaction more difficult. As a result, it is more difficult to obtain catalysts of consistent quality. Nevertheless, useful catalysts are obtained from such agents.

The molar ratio of the Group VIII compound to the activating agent is suitably in the range 2:1 to 0.1:1. In the case of aluminium diethylethoxide and other metal dialkyl compounds the preferred ratio is 1.5:0.8 to 1:2. The preferred range for trialkyl aluminium compounds such as aluminium triethyl is 1.0:0.5 to 1:1.5, while for monoalkyl compounds such as aluminium ethyldiethoxide and n-butyl lithium the preferred range is 1.0:1.5 to 1:4.

Preferably the catalyst is prepared by adding the complex organic compound of the Group VIII metal to an inert diluent and the activating agent to an inert diluent before mixing them in the presence of the olefin. Suitable diluents include normally liquid ethers, hydrocarbons and halogenated hydrocarbons. The preferred diluents are aromatics and halogenated aromatic liquids, e.g., benzene, toluene, xylene and chlorobenzene and ethers e.g. tetrahydrofuran and diethylene-glycol dimethyl ether. The aromatic compounds act as solvents for both components of the catalyst and thus produce a homogeneous catalyst system which is of increased reproducible activity when compared with heterogeneous systems.

The catalyst must be preserved from contact with water, oxygen, alcohols, acids, amines, phosphines, sulphur compounds, dienes, acetylenes, carbon monoxide and other complexing ligands which displace olefins from transition metal complexes. The presence of substantial quantities of these materials will destroy or reduce the efficiency of the catalyst.

According to a further feature of the present invention there is provided a process for the production of a product consisting predominantly of linear dimers having an internal double bond which process comprises dimerising an alpha-olefin in the presence of a catalyst prepared as hereinbefore described at a temperature in the range $-40°$ to $+200°$ C. under such conditions of pressure that the reactants are maintained in the liquid or partially condensed phase.

The preferred olefins for dimerisation contain 2–6 carbon atoms per molecule.

Particularly preferred olefins are ethylene, propylene and butene-1.

Preferably the pressure under which dimerisation involving ethylene is effected is in the range 200–2000 p.s.i.g., whilst for higher olefins the pressure should be sufficient to maintain the olefin at least partially in the liquid phase. For normally liquid olefins, the pressure may be atmospheric or even lower.

The presence of the olefin used in the preparation of the catalyst has no significant effect on the dimerisation reaction nor on the dimers produced when the olefin is not the olefin which is dimerised. However, where an alpha olefin is used in accordance with the invention a limited amount of dimerisation of this olefin and codimerisation with the feed is to be expected.

The invention is illustrated by the following examples.

Examples 1 and 2 are provided for comparative purposes only and are not in accordance with the present invention.

EXAMPLE 1

Hydrated nickel acetylacetonate was dissolved in toluene. The solution was distilled to remove water as the toluene azeotrope. The toluene was finally removed by distillation and the nickel acetylacetonate was further dried under vacuum at 110° C. for 4 hours and stored in an atmosphere of dry nitrogen before use. The dried material (1.3 g.) was dissolved in dry air-free toluene (50 cc.) and cooled to 0° C. while being stirred magnetically. A solution of aluminium diethylethoxide in toluene was prepared, containing 6.8 g. in 100 cc. Part of the solution (9.0 cc.) was added dropwise to the stirred nickel acetylacetonate solution during 10 minutes. Stirring was continued for a further 10 minutes. The mixture was then transferred to a 1-litre rocking autoclave (this takes about 20 minutes) which was pressurised with pure liquid propylene at 580 p.s.i. the temperature being maintained at 40° C. All operations were performed in an atmosphere of dry nitrogen. After 17¼ hours products were vented off into cooled traps (solid carbon dioxide-acetone). After evaporation of unreacted propylene at room temperature a liquid remained which contained in addition to toluene, 101 g. of liquid polymer. This consisted of 84 g. hexenes of which 76 percent was linear hexenes and 17 g. of higher polymer. This corresponds to an activity of 4.5 g. polymer/g. nickel acetylacetonate/h.

EXAMPLE 2

The catalyst was prepared and used exactly as described in Example 1. In the polymerisation reaction the mixture was maintained at 40° C. and 600 p.s.i. for 17¼ hours. In addition to toluene the liquid product consisted of 88 g. hexenes, of which 79 percent was linear hexenes and 14 g. of higher molecular weight polymer. The activity was therefore 4.55 g./g./h.

EXAMPLE 3

The catalyst was prepared and used exactly as described in Example 1 with the exception that 50 cc. 3-methylpenture-1 was added to the solution of nickel acetylacetonate in toluene before addition of the aluminium diethylethoxide solution. The 3-methylpentene-1 had previously been redistilled over potassium and stored under dry nitrogen. The polymerisation reaction with propylene was conducted as in Example 1 at 40° C. and 580 p.s.i. for 16½ hours. After evaporation of unreacted propylene, the liquid product contained, toluene, 3-methylpentene-1 with a little 3-methylpentene-2 formed by isomerisation and 119 g. liquid polymer. The polymer consisted of 96 g. hexenes of which 76 percent was linear hexenes and 22 g. of higher molecular weight polymer. The catalyst activity was therefore 5.5 g./g./h.

EXAMPLE 4

The catalyst was prepared and used exactly as described in Example 3 except that only 10 cc. 3-methylpentene-1 was used. Propylene polymerisation at 40° C./600 p.s.i. for 18¼ hours produced 133 g. liquid polymer consisting of 106 g. hexenes of which 75 percent was linear hexenes and 27 g. of higher molecular weight polymer. The activity of the catalyst was therefore 5.6 g./g./h.

Examples 1 and 2 show that the catalyst prepared at 0° C. in the absence of olefin and transferred to the reactor with a minimum of delay gives an average activity over 17¼ hours of 4.5 g./g. nickel acetylacetonate/ h. If the catalyst is stored under dry nitrogen at room temperature for an additional 1 hour before use its activity falls to 1.5 g./g./h. and after standing for 24 hours the activity is less than 0.1 g./g./h.

Examples 3 and 4 illustrate how catalyst preparation in the presence of an olefin increases catalyst activity by reducing catalyst decay.

It must be understood however that preparation in the presence of an olefin does not enable the catalyst to be stored indefinitely. On standing at 0° C. for 24 hours activity fell to 1.5 g./g./h. and after standing at room temperature for 24 hours the activity was down to 0.5 g./g./h. However this represents a substantial improvement on the preparation in the absence of olefin and enables catalyst compositions of high activity to be prepared outside the reactor, provided they are used within about 1-2 hours.

What we claim is:

1. A process for the preparation of a catalyst suitable for use in the dimerisation of alpha mono-olefins containing 3 to 6 carbon atoms per molecule, which process comprises mixing nickel acetyl acetonate with an activating agent selected from the group consisting of aluminium alkyl alkoxides and aluminium trialkyls, the molar ratio of nickel acetyl acetonate to activating agent being in the range of 2:1 to 0.1:1, in the presence of an olefin under such conditions of temperature and pressure that the olefin is maintained in the liquid phase and dimerisation is not effected.

2. A process according to claim 1 wherein the olefin is 3-methylpentene-1,4-methylpentene-1 or hexene-1.

3. A process according to claim 1 wherein the activating agent is aluminium diethyl ethoxide.

4. A process for the production of a product consisting predominantly of linear dimers having an internal double bond, which process comprises dimerising an alpha olefin containing 3 to 6 carbon atoms per molecule in the presence of a catalyst prepared according to claim 1, the dimerisation being carried out at a temperature in the range of —40 to 200° C. under such conditions that the reactants are maintained in the liquid or partially condensed phase.

References Cited

UNITED STATES PATENTS

| | | | |
|---|---|---|---|
| 3,355,510 | 11/1967 | Cannel et al. | 252—431 XR |
| 3,364,278 | 1/1968 | Reusser. | |
| 3,417,160 | 12/1968 | Hambling et al. | |
| 3,439,009 | 4/1969 | Ketley | 252—431 XR |

PATRICK P. GARVIN, Primary Examiner

U.S. Cl. X.R.

252—431

PO-1050
(5/69)

UNITED STATES PATENT OFFICE
CERTIFICATE OF CORRECTION

Patent No. 3,505,425                    Dated April 7, 1970

Inventor(s) John Robert Jones and Leslie Priestley

It is certified that error appears in the above-identified patent and that said Letters Patent are hereby corrected as shown below:

Column 3, line 28, "1.5:0.8" should read -- 1.0:0.8 --

Column 4, line 49, "methylpenture-1" should read

-- methylpentene-1 --

SIGNED AND
SEALED
NOV 3 1970

(SEAL)
Attest:

Edward M. Fletcher, Jr.
Attesting Officer

WILLIAM E. SCHUYLER, JR.
Commissioner of Patents